United States Patent
Kang et al.

(10) Patent No.: US 10,822,488 B2
(45) Date of Patent: Nov. 3, 2020

(54) THERMOPLASTIC RESIN COMPOSITION HAVING EXCELLENT WEATHER RESISTANCE, METHOD OF PREPARING THE SAME, AND MOLDED PART INCLUDING THE SAME

(71) Applicant: LG CHEM, LTD., Seoul (KR)

(72) Inventors: Eun Soo Kang, Daejeon (KR); Yong Yeon Hwang, Daejeon (KR); Hyun Taek Oh, Daejeon (KR); Bong Keun Ahn, Daejeon (KR); Min Jung Kim, Daejeon (KR); Chun Ho Park, Daejeon (KR); Yong Hee An, Daejeon (KR); Jang Won Park, Daejeon (KR)

(73) Assignee: LG CHEM, LTD., Seoul (KR)

( * ) Notice: Subject to any disclaimer, the term of this patent is extended or adjusted under 35 U.S.C. 154(b) by 211 days.

(21) Appl. No.: 16/069,438

(22) PCT Filed: Nov. 1, 2017

(86) PCT No.: PCT/KR2017/012232
§ 371 (c)(1),
(2) Date: Jul. 11, 2018

(87) PCT Pub. No.: WO2018/084557
PCT Pub. Date: May 11, 2018

(65) Prior Publication Data
US 2019/0023892 A1    Jan. 24, 2019

(30) Foreign Application Priority Data
Nov. 4, 2016 (KR) .......... 10-2016-0146767
Sep. 14, 2017 (KR) .......... 10-2017-0117721

(51) Int. Cl.
| | |
|---|---|
| *C08L 51/00* | (2006.01) |
| *C08L 33/10* | (2006.01) |
| *C08L 33/06* | (2006.01) |
| *C08L 35/06* | (2006.01) |
| *C08L 55/00* | (2006.01) |
| *C08L 51/04* | (2006.01) |
| *C08F 220/18* | (2006.01) |
| *C08L 55/02* | (2006.01) |
| *C08L 23/12* | (2006.01) |
| *C08L 35/04* | (2006.01) |

(52) U.S. Cl.
CPC .......... *C08L 51/003* (2013.01); *C08F 220/18* (2013.01); *C08L 23/12* (2013.01); *C08L 33/06* (2013.01); *C08L 33/10* (2013.01); *C08L 35/04* (2013.01); *C08L 35/06* (2013.01); *C08L 51/04* (2013.01); *C08L 55/00* (2013.01); *C08L 55/02* (2013.01); *C08L 2201/08* (2013.01); *C08L 2205/025* (2013.01); *C08L 2205/035* (2013.01); *C08L 2205/06* (2013.01); *C08L 2207/53* (2013.01)

(58) Field of Classification Search
CPC .. C08L 51/003; C08L 33/10; C08L 2205/035; C08L 2205/06; C08L 2207/53; C08L 2201/08; C08L 2205/025
See application file for complete search history.

(56) References Cited

U.S. PATENT DOCUMENTS 6,288,167 B1    9/2001    Chen et al.

FOREIGN PATENT DOCUMENTS

| EP | 2 818 514 A1 | * 12/2014 |
|---|---|---|
| EP | 2818514 A1 | 12/2014 |
| JP | 2007-152849 A | 6/2007 |
| KR | 1020040110322 A | 12/2004 |
| KR | 10-2007-0117315 A | 12/2007 |
| KR | 10-0962175 B1 | 6/2010 |
| KR | 10-1199758 B1 | 11/2012 |
| KR | 101 199 758 B1 | * 11/2012 |
| KR | 10-2014-0042380 A | 4/2014 |
| KR | 20150002267 A | 1/2015 |

OTHER PUBLICATIONS

International Search Report for PCT/KR2017/012232 filed on Nov. 1, 2017.
Extended European Search Report for European Application No. 17867455.2, dated Sep. 26, 2018.

* cited by examiner

*Primary Examiner* — Robert D Harlan

(57) ABSTRACT

The present invention relates to a thermoplastic resin composition having excellent weather resistance, according to the present invention, the thermoplastic resin composition has excellent weather resistance, gloss, and impact resistance, and thus may be suitable for use as exterior materials for structures, such as siding and window frames.

13 Claims, No Drawings

THERMOPLASTIC RESIN COMPOSITION HAVING EXCELLENT WEATHER RESISTANCE, METHOD OF PREPARING THE SAME, AND MOLDED PART INCLUDING THE SAME

CROSS-REFERENCE TO RELATED APPLICATIONS

This application is a U.S. National Stage of PCT/KR2017/012232 filed Nov. 1, 2017, which claims priority to Korean Patent Application No. 10-2016-0146767, filed on Nov. 4, 2016, and Korean Patent Application No. 10-2017-0117721, re-filed on Sep. 14, 2017, in the Korea Intellectual Property Office, the disclosures of each of which are incorporated herein by reference.

TECHNICAL FIELD

The present invention relates to a thermoplastic resin composition having excellent weather resistance, and more particularly, to a thermoplastic resin composition including two types of graft copolymers each containing acrylate rubber as a core and having different average particle diameters, and an aromatic vinyl compound-methacrylate compound copolymer having a specific range of weight average molecular weight. The thermoplastic resin composition of the present invention has excellent weather resistance, gloss, and impact resistance, and thus may be suitable for use as exterior materials for structures, such as siding and window frames.

BACKGROUND ART

In general, an acrylonitrile-butadiene-styrene resin (hereinafter, referred to as "ABS resin") has excellent impact resistance, mechanical strength, surface properties, and processability and is widely used for electric/electronic products, automotive parts, general merchandise, and the like.

However, since butadiene rubber used as an impact modifier in an ABS resin has an ethylenically unsaturated group, oxidation is easily caused by ultraviolet light, light, or heat in the presence of oxygen, so that the external appearance and color of the resin are changed, and the mechanical properties of the resin are deteriorated. Accordingly, there is a limitation in using an ABS resin as an exterior material.

On the other hand, in an acrylate-styrene-acrylonitrile (ASA) copolymer resin, acrylic rubber not containing an ethylenically unsaturated group is used as an impact modifier instead of butadiene rubber. Therefore, ASA copolymer resins are used in outdoor products, such as electric/electronic products, building materials, automobiles, ships, leisure goods, and garden goods. However, to date, ASA copolymer resins do not satisfy mechanical properties, surface properties, and weather resistance required in the market. Therefore, studies are actively conducted to prepare copolymers satisfying such properties.

RELATED ART DOCUMENT

Patent Document (Patent Document 1) KR 10-0962175 B1 (registered on Jun. 1, 2010)

DISCLOSURE

Technical Problem

Therefore, the present invention has been made in view of the above problems, and it is one object of the present invention to provide a thermoplastic resin composition including two types of graft copolymers each containing acrylate rubber as a core and having different average particle diameters, and an aromatic vinyl compound-methacrylate compound copolymer having a specific range of weight average molecular weight. The thermoplastic resin composition of the present invention has excellent weather resistance, gloss, and impact resistance, and thus may be suitable for use as exterior materials for structures, such as siding and window frames.

The above and other objects can be accomplished by the present disclosure described below.

Technical Solution

In accordance with one aspect of the present invention, provided is a thermoplastic resin composition having excellent weather resistance, comprising 100 parts by weight of a base resin, wherein the base resin comprises (A) to 40% by weight of a first graft copolymer having an average particle diameter of 2,500 to 6,000 Å and containing acrylate rubber as a core, (B) 5 to 40% by weight of a second graft copolymer having an average particle diameter of 500 to 2,000 Å and containing acrylate rubber as a core, and (C) 20 to 80% by weight of an aromatic vinyl compound-(meth)acrylate compound copolymer having a weight average molecular weight of 50,000 to 150,000 g/mol; and (D) 0.1 to 6 parts by weight of a syndiotactic polystyrene resin, wherein the weight ratio of the first graft copolymer to the second graft copolymer is from 1:0.5 to 1:3.

Advantageous Effects

As apparent from the foregoing, the present invention advantageously provides a thermoplastic resin composition and a method of preparing the same. The thermoplastic resin composition of the present invention has excellent weather resistance, gloss, and impact resistance, and thus can be suitable for use as exterior materials for structures, such as siding and window frames.

BEST MODE

Hereinafter, the thermoplastic resin composition having excellent weather resistance of the present invention will be described in detail.

The present inventors confirmed that, when a thermoplastic resin composition includes two types of graft copolymers each containing acrylate rubber as a core and having different average particle diameters in a specific weight ratio, and an aromatic vinyl compound-methacrylate compound copolymer having a specific range of weight average molecular weight, the weather resistance of the thermoplastic resin composition was significantly improved, and the thermoplastic resin composition had excellent gloss and impact resistance. Based on these results, the present invention was completed.

The thermoplastic resin composition of the present invention comprises 100 parts by weight of a base resin, wherein the base resin comprises (A) 5 to 40% by weight of a first graft copolymer having an average particle diameter of 2,500 to 6,000 Å and containing acrylate rubber as a core, (B) 5 to 40% by weight of a second graft copolymer having an average particle diameter of 500 to 2,000 Å and containing acrylate rubber as a core, and (C) 20 to 80% by weight of an aromatic vinyl compound-(meth)acrylate compound copolymer having a weight average molecular weight of 50,000 to 150,000 g/mol; and (D) 0.1 to 6 parts by weight of a syndiotactic polystyrene resin, wherein the weight ratio of the first graft copolymer to the second graft copolymer is from 1:0.5 to 1:3.

Hereinafter, (A) to (D) will be described in detail.

(A) First Graft Copolymer

For example, the first graft copolymer (A) may have an average particle diameter of 2,500 to 6,000 Å and contain acrylate rubber as a core.

For example, the first graft copolymer (A) may have an average particle diameter of 2,500 to 6,000 Å or 4,000 to 6,000 Å, preferably 4,500 to 5,500 Å. Within this range, impact resistance and weather resistance may be improved.

In addition, the average particle diameter of the acrylate rubber may be, for example, 2,000 to 5,000 Å or 3,000 to 4,500 Å, preferably 3,500 to 4,500 Å. Within this range, gloss, impact resistance, and weather resistance may be improved.

For example, the first graft copolymer (A) may be included in the base resin in an amount of 5 to 40% by weight or 10 to 35% by weight, preferably 20 to 30% by weight. Within this range, weather resistance may be improved.

For example, the first graft copolymer (A) may be obtained by graft-polymerizing 25 to 55% by weight of an aromatic vinyl compound and 10 to 30% by weight of a vinyl cyanide compound onto 20 to 60% by weight of an acrylate rubber core.

Alternatively, for example, the first graft copolymer (A) may be obtained by graft-polymerizing 30 to 50% by weight of an aromatic vinyl compound and 15 to 30% by weight of a vinyl cyanide compound onto 40 to 60% by weight of an acrylate rubber core. Within this range, impact resistance and weather resistance may be improved.

Preferably, for example, the first graft copolymer (A) is obtained by graft-polymerizing 30 to 40% by weight of an aromatic vinyl compound and 20 to 30% by weight of a vinyl cyanide compound onto 45 to 55% by weight of an acrylate rubber core. Within this range, impact resistance and weather resistance may be improved.

In the present disclosure, the graft copolymer refers to a copolymer having a core-shell structure including a rubber core and a shell surrounding the rubber core.

For example, the acrylate rubber may be alkyl acrylate rubber.

For example, the alkyl acrylate rubber may be acrylate rubber having an alkyl group having 1 to 10 carbon atoms. As a specific example, the alkyl acrylate rubber may be one or more selected from the group consisting of ethyl acrylate rubber, propyl acrylate rubber, butyl acrylate rubber, hexyl acrylate rubber, octyl acrylate rubber, and 2-ethylhexyl acrylate rubber, more preferably butyl acrylate rubber. In this case, surface gloss, weather resistance, and impact resistance may be improved.

For example, the aromatic vinyl compound may be one or more selected from the group consisting of styrene, α-methyl styrene, p-methyl styrene, 2,4-dimethyl styrene, and vinyl toluene, preferably styrene.

For example, the vinyl cyanide compound may be one or more selected from the group consisting of acrylonitrile, methacrylonitrile, and ethacrylonitrile.

For example, the first graft copolymer may have a gel content of less than 92% by weight or 30 to 90% by weight, preferably 50 to 90% by weight. Within this range, mechanical properties, such as impact strength and flexural properties, and weather resistance may be improved.

For example, the first graft copolymer may have a swelling index of 6 to 14 or 6 to 12, preferably 6 to 10. Within this range, mechanical properties, such as impact strength and flexural properties, and weather resistance may be improved.

In addition, the degree of grafting of the first graft copolymer may be 20 to 100% or 40 to 80%, preferably 45 to 60%. Within this range, mechanical properties, such as impact strength, and weather resistance may be improved.

(B) Second Graft Copolymer

For example, the second graft copolymer (B) may have an average particle diameter of 500 to 2,000 Å and contain acrylate rubber as a core.

For example, the second graft copolymer (B) may have an average particle diameter of 500 to 2,000 Å or 1,000 to 2,000 Å, preferably 1,300 to 1,700 Å. Within this range, impact resistance and weather resistance may be improved.

In addition, the average particle diameter of the acrylate rubber may be, for example, 400 to 1,800 Å or 800 to 1,800 Å, preferably 1,200 to 1,500 Å. Within this range, gloss, impact resistance, and weather resistance may be improved.

For example, the second graft copolymer (B) may be included in the base resin in an amount of 5 to 40% by weight or 15 to 35% by weight, preferably 20 to 30% by weight. Within this range, weather resistance may be improved.

For example, the second graft copolymer (B) may be obtained by graft-polymerizing 25 to 55% by weight of an aromatic vinyl compound and 10 to 30% by weight of a vinyl cyanide compound onto 20 to 60% by weight of an acrylate rubber core.

Alternatively, for example, the second graft copolymer (B) may be obtained by graft-polymerizing 30 to 50% by weight of an aromatic vinyl compound and 15 to 30% by weight of a vinyl cyanide compound onto 40 to 60% by weight of an acrylate rubber core. Within this range, impact resistance and weather resistance may be improved.

Preferably, for example, the second graft copolymer (B) is obtained by graft-polymerizing 30 to 40% by weight of an aromatic vinyl compound and 20 to 30% by weight of a vinyl cyanide compound onto 45 to 55% by weight of an acrylate rubber. Within this range, impact resistance and weather resistance may be improved.

For example, the weight ratio of the first graft copolymer to the second graft copolymer may be 1:0.5 to 1:3 or 1:0.5 to 1:2, preferably 1:0.5 to 1:1.5. Within this range, gloss, impact resistance, and weather resistance may be improved.

For example, the total content of rubber contained in the first graft copolymer and the second graft copolymer may be 10 to 30% by weight, 20 to 27% by weight, or 22 to 25% by weight with respect to 100% by weight of the total thermoplastic resin composition. Within this range, mechanical properties may be improved.

For example, the gel content of the second graft copolymer may be less than 90% by weight or 30 to 90% by weight, preferably 50 to 90% by weight. Within this range, mechanical properties, such as impact strength and flexural strength, and weather resistance may be improved.

For example, the swelling index of the second graft copolymer may be 6 to 14 or 6 to 12, preferably 6 to 10. Within this range, mechanical properties, such as impact strength and flexural strength, and weather resistance may be improved.

In addition, the degree of grafting of the second graft copolymer may be, for example, 20 to 80% or 25 to 60%, preferably 25 to 40% Within this range, mechanical properties, such as impact strength and flexural strength, and weather resistance may be improved.

For example, the gel content and swelling index used in the present invention can be obtained in the following manner. Acetone is added to 1 g of graft copolymer powder, followed by stirring at room temperature for 24 hours. Then, centrifugation is performed to obtain only an acetone-insoluble portion. The weight of the portion before/after drying is measured, and the gel content and swelling index can be calculated using the following equation.

Gel content (%)=(weight after drying after centrifugation/sample weight)×100

Swelling index=weight before drying after centrifugation/weight after drying after centrifugation For example, the degree of grafting used in the present invention can be obtained in the following manner. The resin latex of a graft polymer is coagulated, washed, and dried to obtain a powder. 300 ml of acetone is added to 2 g of the powder, followed by stirring for 24 hours. Then, the solution is subjected to ultracentrifugation to separate an acetone solution. Methanol is added to the separated acetone solution to obtain a non-grafted portion. After drying, the weight of the dried non-grafted portion is measured. The degree of grafting can be calculated using the following equation.

Degree of grafting (%)=(weight of grafted monomer (g)/weight of rubber (g))×100

In the present invention, the first graft copolymer may be prepared by emulsion graft polymerization of an aromatic vinyl compound and a vinyl cyanide compound onto an acrylate rubber polymer having an average particle diameter of 2,000 to 5,000 Å, without being limited thereto. The polymerization method is described in detail below.

First, an acrylate rubber polymer having an average particle diameter of 2,000 to 5,000 Å (hereinafter, referred to as "large diameter acrylate rubber polymer") may be prepared by performing emulsion polymerization of acrylate monomers. Specifically, the large diameter acrylate rubber polymer may be prepared by mixing acrylate monomers, an emulsifier, an initiator, an electrolyte, and water and performing emulsion polymerization of the mixture. As another example, the large diameter acrylate rubber polymer may be prepared by mixing acrylate monomers, an emulsifier, an initiator, a grafting agent, a crosslinking agent, an electrolyte, and water and performing emulsion polymerization of the mixture. The prepared large diameter acrylate rubber polymer may be in a latex form.

For example, the acrylate monomer is preferably butyl acrylate, ethylhexyl acrylate, or a combination thereof, more preferably butyl acrylate. The acrylate monomer is preferably used in an amount of 20 to 60% by weight with respect to the total weight of the first graft copolymer. Within this range, the object of the present invention may be achieved more easily.

In addition, the emulsifier is preferably an aqueous solution having a pH of 3 to 9 and containing an alkylsulfosuccinic acid metal salt derivative having 12 to 18 carbon atoms, or an alkyl sulfate having 12 to 20 carbon atoms or a sulfonic acid metal salt derivative thereof. Specifically, the alkylsulfosuccinic acid metal salt derivative having 12 to 18 carbon atoms contained in the aqueous solution having a pH of 3 to 9 is preferably sodium dicyclohexyl sulfosuccinate, sodium dihexyl sulfosuccinate, sodium bis(2-ethylhexyl) sulfosuccinate, potassium bis(2-ethylhexyl)sulfosuccinate, or lithium bis(2-ethylhexyl)sulfosuccinate, and the alkyl sulfate having 12 to carbon atoms or the sulfonic acid metal salt derivative thereof is preferably sodium lauryl sulfate, sodium dodecyl sulfate, sodium dodecylbenzene sulfate, sodium octadecyl sulfate, sodium oleic sulfate, potassium dodecyl sulfate, or potassium octadecyl sulfate. The amount of the emulsifier used is preferably 1 to 4 parts by weight, more preferably 1.5 to 3 parts by weight with respect to the total weight of the large diameter acrylate rubber polymer.

In addition, for example, the initiator is preferably an inorganic or organic peroxide. Specifically, the initiator is preferably a water-soluble initiator, such as potassium persulfate, sodium persulfate, and ammonium persulfate or a fat-soluble initiator, such as cumene hydroperoxide and benzoyl peroxide. The amount of the initiator used is preferably 0.05 to 0.2 parts by weight with respect to the total weight of the large diameter acrylate rubber polymer.

In the present invention, the total weight of the acrylate rubber polymer may be the weight of the prepared acrylate rubber polymer itself, or the total weight of monomers added when polymerization is performed to prepare the acrylate rubber polymer.

In addition, for example, the grafting agent is preferably allyl methacrylate, triallyl isocyanurate, triallylamine, or diallylamine, and is preferably used in an amount of 0.01 to 0.07 parts by weight with respect to the total weight of the large diameter acrylate rubber polymer. Within this range, the object of the present invention may be achieved more easily.

In addition, for example, the crosslinking agent is preferably ethylene glycol dimethacrylate, diethylene glycol dimethacrylate, triethylene glycol dimethacrylate, 1,3-butanediol dimethacrylate, 1,6-hexanediol dimethacrylate, neopentyl glycol dimethacrylate, trimethylolpropane trimethacrylate, or trimethylolmethane triacrylate, and is preferably used in an amount of 0.02 to 0.3 parts by weight with respect to the total weight of the large diameter acrylate rubber polymer.

When the grafting agent and the crosslinking agent are used to prepare the acrylate rubber polymer according to the present invention, elasticity may be further increased, and physical properties, such as impact strength, may be further improved.

In addition, the electrolyte is preferably $NaHCO_3$, $Na_2S_2O_7$, or $K_2CO_3$, and is preferably used in an amount of 0.05 to 0.4 parts by weight with respect to the total weight of the large diameter acrylate rubber polymer.

In addition, the water serves as a medium in which emulsion polymerization proceeds, and is preferably deionized water, and the amount thereof may be selectively adjusted as needed.

For example, each of the components may be continuously fed during polymerization or may be fed into a reactor in such a manner that continuous feed and batch feed are used together, and may be polymerized. In addition, the large diameter acrylate rubber polymer may be prepared using emulsion polymerization conditions commonly known in the art to which the present invention pertains.

For example, the pH of the prepared large diameter acrylate rubber polymer is preferably 5 to 9, more preferably pH 6 to 8 in the latex state immediately after polymerization. Within this range, the stability of the prepared latex may be increased.

In addition, for example, the average particle diameter of the large diameter acrylate rubber polymer is preferably 2,000 to 5,000 Å, or 3,000 to 4,500 Å, more preferably 3,500 to 4,500 Å. When the average particle diameter of the rubber polymer is less than 2,000 Å, mechanical properties, such as impact strength and tensile strength, may be deteriorated, also a large amount of emulsifier may be required and thermal stability may be decreased. When the average particle diameter of the rubber polymer is more than 5,000 Å, colorability may be deteriorated.

For example, the large diameter acrylate rubber polymer may be mixed with an aromatic vinyl monomer, a vinyl cyan monomer, and, when necessary, a polymerization additive, and emulsion polymerization may be performed to form a first graft copolymer in which a copolymer composed of an aromatic vinyl monomer and a vinyl cyan monomer is grafted onto the backbone of the acrylate rubber polymer.

For example, the polymerization additive may include a grafting agent and/or a crosslinking agent, which are the same as the grafting agent and the crosslinking agent used in the above-described large diameter acrylate rubber polymer. The grafting agent and the crosslinking agent may be used in the same parts by weight with respect to 100 parts by weight of the total monomers excluding rubber.

When the first graft copolymer is prepared, in addition to the large diameter acrylate rubber polymer, the aromatic vinyl monomer, and the vinyl cyan monomer, an emulsifier, a polymerization initiator, a molecular weight modifier, and water, which are commonly used in the art to which the present invention pertains, may be used depending on application. Accordingly, the first graft copolymer may be in the form of a latex.

Specifically, the emulsifier is preferably an aqueous solution having a pH of 9 to 13 and containing a carboxylic acid metal salt derivative such as a fatty acid metal salt having 12 to 20 carbon atoms and a rosin acid metal salt having 12 to 20 carbon atoms.

For example, the fatty acid metal salt having 12 to 20 carbon atoms is preferably sodium fatty acid, sodium laurate, sodium oleate, or potassium oleate, and the rosin acid metal salt having 12 to 20 carbon atoms is preferably sodium rosinate or potassium rosinate. For example, the emulsifier is preferably used in an amount within a range of 1 to 2 parts by weight with respect to 100 parts by weight of reactants used to prepare the first graft copolymer, including the large diameter acrylate rubber polymer, the aromatic vinyl monomer, and the vinyl cyan monomer.

In addition, as the polymerization initiator, for example, the same initiator as the initiator used to prepare the large diameter acrylate rubber polymer may be used. For example, the polymerization initiator is preferably used in an amount of 0.05 to 0.3 parts by weight with respect to 100 parts by weight of the reaction mixture of the first graft copolymer.

In addition, t-dodecyl mercaptan or n-octyl mercaptan may, for example, be used as the molecular weight modifier. The molecular weight modifier is preferably used in an amount of 0.02 to 0.2 parts by weight with respect to 100 parts by weight of the reaction mixture of the first graft copolymer.

In addition, the water is preferably deionized water, and is preferably used in an amount commonly used in the art to which the present invention pertains with respect to 100 parts by weight of the reaction mixture of the first graft copolymer.

In preparation of the first graft copolymer, that is, in graft polymerization, when the reaction mixture and the additives are added in a batch, the pH of a polymerization system is temporarily increased, which makes grafting difficult and lowers the stability of copolymer particles, so that the internal structure of the particles becomes nonuniform. Therefore, when the first graft copolymer is prepared by graft polymerization, the reaction mixture and the additives are preferably continuously added, for example, continuously for 1 to 10 hours.

When necessary, the first graft copolymer may be prepared by performing emulsion polymerization of the added reaction mixture and additives using polymerization conditions commonly known in the art to which the present invention pertains.

For example, the pH of the first graft copolymer is preferably 8 to 11, more preferably 9 to 10.5 in the latex state immediately after polymerization. Within this range, latex stability may be increased.

For example, the content of the first graft copolymer including the large diameter acrylate rubber polymer may be 5 to 40% by weight with respect to the total weight of the thermoplastic resin composition according to the present invention. When the copolymer is contained in an amount within this range, fluidity during processing of a product may be improved, and impact strength after molding may be improved. The content of the copolymer is preferably 7 to 30% by weight, more preferably 15 to 30% by weight. When the content of the first graft copolymer is more than 40% by weight, fluidity, hardness, and scratch resistance may be deteriorated. When the content of the first graft copolymer is less than 5% by weight, mechanical properties may be deteriorated.

In the present invention, the second graft copolymer may be prepared by emulsion graft polymerization of an aromatic vinyl monomer and a vinyl cyan monomer onto an acrylate rubber polymer having an average particle diameter of 400 to 1,800 Å, without being limited thereto. The polymerization method is described in detail below.

First, an acrylate rubber polymer having an average particle diameter of 400 to 1,800 Å (hereinafter, "small diameter acrylate rubber polymer") included in the second graft copolymer may be, for example, prepared by performing emulsion polymerization of acrylate monomers. As a specific example, the small diameter acrylate rubber polymer may be prepared by mixing acrylate monomers, an emulsifier, an initiator, a grafting agent, a crosslinking agent, an electrolyte, and water and performing emulsion polymerization of the mixture.

For example, the acrylate monomer may be the same as the acrylate monomer used in preparation of the large diameter acrylate rubber polymer, and is preferably used in amount of 10 to 60% by weight with respect to the total weight of the small diameter acrylate rubber polymer.

In addition, the emulsifier may be, for example, the same as the emulsifier used in preparation of the large diameter acrylate rubber polymer, and is preferably used in an amount of 0.1 to 1 part by weight with respect to the total weight of the small diameter acrylate rubber polymer.

In addition, an initiator, a grafting agent, a crosslinking agent, an electrolyte, and water used in preparation of the small diameter acrylate rubber polymer may be the same as those used in preparation of the large diameter acrylate rubber polymer, and the amount of each of the components used in both cases may be the same.

For example, each of the components may be continuously fed into a reactor or may be fed into a reactor in such a manner that continuous feed and batch feed are used together, and the small diameter acrylate rubber polymer may be prepared by performing emulsion polymerization of the components using polymerization conditions commonly known in the art to which the present invention pertains. Thus, the small diameter acrylate rubber polymer may be in the form of a latex.

For example, the pH of the prepared small diameter acrylate rubber polymer is preferably 5 to 9, more preferably 6 to 8 in the latex state immediately after polymerization. Within this range, the stability of the latex may be increased.

In addition, for example, the average particle diameter of the small diameter acrylate rubber polymer is preferably 400 to 1,800 Å or 800 to 1,800 Å, more preferably 1,200 to 1,500 Å. When the average particle diameter of the small diameter acrylate rubber polymer is less than 400 Å, mechanical properties, such as impact strength and tensile strength, may be difficult to maintain. On the other hand, when the average particle diameter is more than 1,800 Å, fluidity, processability, and gloss may be deteriorated, which is undesirable.

As a specific example, the small diameter acrylate rubber polymer is mixed with an aromatic vinyl monomer, a vinyl cyan monomer, and a polymerization additive, and emulsion graft polymerization of the mixture is performed to prepare the second graft copolymer in which a copolymer composed of the aromatic vinyl monomer and the vinyl cyan monomer are grafted onto the backbone of the small diameter acrylate rubber polymer. Thus, the second graft copolymer may be in the form of a latex.

At this time, description of the polymerization additive may include description of the polymerization additive of the first graft polymer described above.

For example, when the second graft copolymer is prepared, the small diameter acrylate rubber polymer is preferably used in an amount of 30 to 70% by weight with respect to the total weight of the second graft copolymer including the small diameter acrylate rubber polymer. Within this range, impact strength is excellent, and the degree of grafting is increased, so that hardness and scratch resistance may be improved.

In addition, an aromatic vinyl monomer, a vinyl cyan monomer, an emulsifier, a polymerization initiator, and a molecular weight modifier used in preparation of the second graft copolymer may be the same as those used in preparation of the first graft copolymer, and the amount of each of the components used in both cases may be the same.

In preparation of the second graft copolymer, that is, in graft polymerization, when the reaction mixture and the additives are added in a batch, the pH of a polymerization system is temporarily increased, which makes grafting difficult and lowers the stability of copolymer particles, so that the internal structure of the particles becomes nonuniform. Therefore, when graft polymerization is performed, the reaction mixture and the additives are preferably continuously added, for example, continuously for 1 to 10 hours.

When necessary, the second graft copolymer may be prepared by performing emulsion polymerization of the added reaction mixture and additives using polymerization conditions commonly known in the art to which the present invention pertains.

For example, the pH of the second graft copolymer is preferably 8 to 11, more preferably 9 to 10.5 in the latex state immediately after polymerization. Within this range, the stability of the latex may be increased.

For example, the content of the second graft copolymer may be 5 to 40% by weight with respect to the total weight of the thermoplastic resin composition. When the second graft copolymer is used in an amount of less than 5% by weight, impact strength may be deteriorated. On the other hand, when the second graft copolymer is used in an amount of more than 40% by weight, the degree of grafting is lowered, such that hardness and scratch resistance may be deteriorated. Thus, the content of the second graft copolymer is preferably 15 to 35% by weight, more preferably 15 to 30% by weight.

As a specific example, the first graft copolymer latex and the second graft copolymer latex are coagulated using an aqueous solution of calcium chloride at 80 to 90° C., or 85° C. and at atmospheric pressure, and are aged at a temperature of more than 90° C. and 100° C. or less, or 95° C. Then, after dehydrating and washing the latex, drying is performed using hot air at 85 to 95° C., or 90° C. for 20 minutes to 1 hour, or 30 minutes to obtain a powder.

(C) Aromatic Vinyl Compound-(Meth)Acrylate Compound Copolymer

For example, the weight average molecular weight of the aromatic vinyl compound-(meth)acrylate compound copolymer (C) may be 50,000 to 150,000 g/mol, 70,000 to 140,000 g/mol, or 80,000 to 130,000 g/mol. Within this range, a resin having excellent gloss and impact strength and having superior weather resistance to conventional resins may be prepared.

Alternatively, the weight average molecular weight of the aromatic vinyl compound-(meth)acrylate compound copolymer (C) may be 50,000 to 100,000 g/mol or 60,000 to 90,000 g/mol, preferably 75,000 to 85,000 g/mol. Within this range, a resin having excellent impact strength and having superior weather resistance to conventional resins may be prepared.

As another example, the weight average molecular weight of the aromatic vinyl compound-(meth)acrylate compound copolymer (C) may be more than 100,000 g/mol and 150,000 g/mol or less, or 110,000 to 130,000 g/mol, preferably 120,000 to 140,000 g/mol. Within this range, a resin having excellent impact strength and having superior weather resistance to conventional resins may be prepared.

As another example, in the case of the aromatic vinyl compound-(meth)acrylate compound copolymer (C), an aromatic vinyl compound-(meth)acrylate compound copolymer (C-1) having a weight average molecular weight of 50,000 to 100,000 g/mol or 60,000 to 90,000 g/mol, preferably 75,000 to 85,000 g/mol and an aromatic vinyl compound-(meth)acrylate compound copolymer (C-2) having a weight average molecular weight of more than 100,000 g/mol and 150,000 g/mol or less, or 110,000 to 130,000 g/mol, preferably 120,000 to 140,000 g/mol, may be used in combination. In this case, a resin having excellent impact strength and having superior weather resistance to conventional resins may be prepared.

For example, when two types of aromatic vinyl compound-(meth)acrylate compound copolymers each having different weight average molecular weights are used in combination, 10 to 40% by weight or 15 to 35% by weight, preferably 20 to 30% by weight of the aromatic vinyl compound-(meth)acrylate compound copolymer (C-1) having a weight average molecular weight of 50,000 to 100,000 g/mol; and 10 to 40% by weight or 15 to 35% by weight, preferably to 30% by weight of the aromatic vinyl compound-(meth)acrylate compound copolymer (C-2) having a weight average molecular weight of more than 100,000 g/mol and 150,000 g/mol or less may be contained in the base resin. Within this range, the desired effects of the present invention may be achieved.

For example, the aromatic vinyl compound-(meth)acrylate compound copolymer (C) may be included in the base resin in an amount of 20 to 80% by weight, 25 to 70% by weight, preferably 25 to 50% by weight. Within this range, weather resistance may be improved.

The aromatic vinyl compound-(meth)acrylate compound copolymer (C) may include 65 to 85% by weight of the (meth)acrylate compound and 15 to 35% by weight of the aromatic vinyl compound. Within this range, gloss and impact resistance may be excellent, and in particular, weather resistance may be improved.

Alternatively, the aromatic vinyl compound-(meth)acrylate compound copolymer (C) may include, for example, 65 to 82% by weight of the (meth)acrylate compound and 18 to 35% by weight of the aromatic vinyl compound. Within this range, impact resistance and weather resistance may be improved.

As another example, the aromatic vinyl compound-(meth)acrylate compound copolymer (C) may include 65 to 75% by weight of the (meth)acrylate compound and 25 to 35% by weight of the aromatic vinyl compound. Within this range, the desired effects of the present invention may be achieved.

As another example, the aromatic vinyl compound-(meth)acrylate compound copolymer (C) may further include 0.1 to 15% by weight or 0.1 to 10% by weight, preferably 1 to 10% by weight of a vinyl cyanide compound. Within this range, the desired effects of the present invention may be achieved.

For example, the (meth)acrylate compound may be one or more selected from the group consisting of methyl acrylate, ethyl acrylate, methyl methacrylate, ethyl methacrylate, methyl ethacrylate, ethyl ethacrylate, propyl acrylate, isopropyl acrylate, butyl acrylate, propyl methacrylate, isopropyl methacrylate, butyl methacrylate, and isobutyl methacrylate.

For example, the aromatic vinyl compound may be one or more selected from the group consisting of styrene, α-methyl styrene, p-methyl styrene, 2,4-dimethyl styrene, and vinyl toluene, preferably styrene.

A method of preparing the aromatic vinyl compound-(meth)acrylate compound copolymer (C) is not particularly limited so long as the prepared copolymer satisfies the above-described characteristics, and conventional techniques may be used.

(D) Syndiotactic Polystyrene Resin

For example, the syndiotactic polystyrene resin (D) may be included in an amount of 0.1 to 6 parts by weight, 1 to 6 parts by weight, or 2 to 5 parts by weight with respect to 100 parts by weight of the base resin. Within this range, a resin having excellent gloss and having superior weather resistance to conventional resins may be prepared.

For example, the syndiotactic polystyrene resin may be a syndiotactic polystyrene, a derivative of a syndiotactic polystyrene, or a mixture thereof.

For example, the syndiotactic polystyrene may be one or more selected from the group consisting of diene polystyrene having tacticity of 85% or more, pentad (racemic pentad) polystyrene having tacticity of 35% or more, polyhalogenated styrene, polyalkoxystyrene, polyalkylstyrene, polybenzoic acid ester styrene, and a copolymer mainly composed of the compounds. Within this range, the objects of the present invention may be easily achieved.

For example, the derivative of the syndiotactic polystyrene may be one or more selected from the group consisting of syndiotactic polyhalogenated styrene, syndiotactic polyalkoxystyrene, syndiotactic polyalkylstyrene, syndiotactic polybenzoic acid ester styrene, syndiotactic polystyrene anhydrous maleic acid (sPS-MAH), carboxyl terminal-syndiotactic polystyrene (sPSCOOH), anhydrous maleic acid-syndiotactic polystyrene (sPS-MAH), maleic acid-syndiotactic polystyrene (sPS-MA), fumaric acid-syndiotactic polystyrene (sPS-FA), glycidyl methacrylate-syndiotactic polystyrene (sPS-GMA), and a copolymer mainly composed of the compounds. Within this range, the objects of the present invention may be easily achieved.

For example, when the tacticity of the syndiotactic polystyrene resin is 90% or more or 97% or more, preferably % or more when measured by 13 C-NMR, gloss and weather resistance may be improved.

In addition, the melting temperature of the syndiotactic polystyrene resin may be, for example, 240 to 300° C. or 260 to 280° C. Within this range, gloss and weather resistance may be improved. Melting temperature may be measured using, for example, a differential scanning calorimeter (DSC 2910, TA Instruments, Inc.).

A method of preparing the syndiotactic polystyrene resin (D) is not particularly limited so long as the prepared resin satisfies the above-described characteristics, and conventional techniques may be used.

(E) Aromatic Vinyl Compound-Vinyl Cyanide Compound Copolymer

The thermoplastic resin composition may further include, for example, the aromatic vinyl compound-vinyl cyanide compound copolymer (E).

For example, the aromatic vinyl compound-vinyl cyanide compound copolymer (E) may have a weight average molecular weight of 130,000 to 170,000 g/mol or 140,000 to 160,000 g/mol, preferably 145,000 to 155,000 g/mol. Within this range, weather resistance and impact resistance may be improved.

For example, the aromatic vinyl compound-vinyl cyanide compound copolymer (E) may be included in an amount of 10 to 30% by weight or 15 to 30% by weight, preferably 20 to 25% by weight with respect to 100% by weight of the total base resin. Within this range, weather resistance and impact resistance may be improved.

For example, in the aromatic vinyl compound-vinyl cyanide compound copolymer (E), the aromatic vinyl compound may be included in an amount of 60 to 90% by weight or 65 to % by weight, preferably 70 to 80% by weight, and the vinyl cyan compound may be included in an amount of 10 to 40% by weight or 20 to 35% by weight, preferably 20 to 30% by weight. Within this range, when the aromatic vinyl compound-vinyl cyanide compound copolymer (E) is used with the aromatic vinyl compound-(meth)acrylate compound copolymer (C), weather resistance, gloss, and impact strength may be improved.

For example, the vinyl cyanide compound of the present invention may be one or more selected from the group consisting of acrylonitrile, methacrylonitrile, and ethacrylonitrile, preferably acrylonitrile.

For example, the glass transition temperature (Tg) of the aromatic vinyl compound-vinyl cyan compound copolymer (E) may be 100 to 130° C. or 115 to 125° C., preferably 120 to 125° C. Within this range, impact strength and weather resistance may be improved. For example, the glass transition temperature may be measured using a differential scanning calorimeter.

A method of preparing the aromatic vinyl compound-vinyl cyanide compound copolymer (E) is not particularly limited so long as the prepared copolymer satisfies the above-described characteristics, and conventional techniques may be used.

(F) Plasticizer

For example, the thermoplastic resin composition may further include 0.1 to 10 parts by weight, 1 to 7 parts by weight, or 1 to 5 parts by weight of a plasticizer with respect to 100 parts by weight of the base resin. Within this range, processability and impact resistance may be improved.

The plasticizer may be a plasticizer commonly used in the art to which the present invention pertains. For example, the plasticizer may be one or more selected from a phthalic acid ester plasticizer, such as diisopropyl phthalate, dibutyl phthalate, bis(2-ethylhexyl)phthalate, diisononyl phthalate, diisodecyl phthalate, and butylbenzyl phthalate; a trimellitic acid ester plasticizer, such as triethylhexyl trimellitate, triisononyl trimellitate, and triisodecyl trimellitate; and a phosphoric acid ester plasticizer, such as tricresyl phosphate, tris(2-ethylhexyl) phosphate, cresyl diphenyl phosphate, and triaryl phosphate. The plasticizer is preferably a phthalic acid ester plasticizer. In this case, processability and impact resistance may be improved.

For example, the thermoplastic resin composition may further include one or more additives selected from the group consisting of an anti-dripping agent, a flame retardant, an antimicrobial agent, an antistatic agent, a stabilizer, a release agent, a heat stabilizer, an inorganic additive, a lubricant, an antioxidant, a light stabilizer, a pigment, a dye, and an inorganic filler.

For example, the additive may be used in an amount of 0.1 to 5 parts by weight or 0.5 to 1 part by weight with respect to 100 parts by weight of the base resin. Within this range, the inherent properties of the additive may be realized without impairing the desired effects of the present invention.

For example, the thermoplastic resin composition may include 100 parts by weight of a base resin, wherein the base resin comprises (A) 5 to 40% by weight of a first graft copolymer having an average particle diameter of 2,500 to 6,000 Å and containing acrylate rubber as a core, (B) 5 to 40% by weight of a second graft copolymer having an average particle diameter of 500 to 2,000 Å and containing acrylate rubber as a core, and (C) 20 to 80% by weight of an aromatic vinyl compound-(meth)acrylate compound copolymer having a weight average molecular weight of 50,000 to 150,000 g/mol; and (D) 0.1 to 6 parts by weight of a syndiotactic polystyrene resin. The thermoplastic resin composition may be prepared by a method including a step of mixing the first graft copolymer and the second graft copolymer in a weight ratio of 1:0.5 to 1:3, and melt-kneading and extruding the mixture.

For example, when the thermoplastic resin composition is prepared, 0.1 to 10 parts by weight, 1 to 7 parts by weight, or 1 to 5 parts by weight of the plasticizer may be further included with respect to 100 parts by weight of the base resin. Within this range, the desired effects of the present invention may be achieved.

For example, the thermoplastic resin composition may have a ΔE value of less than 1.5, or 1.0 or less when 6,000 hours have passed under ASTM J1960 conditions.

For example, when the gloss of the thermoplastic resin composition is measured using a TOYOSEIKI glossmeter, gloss (60°) may be 1 to 50 or 20 to 40, preferably 30 to 35.

For example, the thermoplastic resin composition may be used to prepare exterior materials for buildings.

In addition, the exterior materials for buildings may be, for example, siding or decorative materials for building exteriors.

Hereinafter, the present invention will be described in more detail with reference to the following preferred examples. However, these examples are provided for illustrative purposes only and should not be construed as limiting the scope and spirit of the present invention. In addition, it will be apparent to those skilled in the art that various changes and modifications may be made without departing from the spirit and scope of the present invention, and such changes and modifications are also within the scope of the appended claims.

EXAMPLE

Examples 1 to 5 and Comparative Examples 1 to 5

The respective components were added in the respective amounts and mixed as described in Tables 1 and 2 below, and the mixture was extruded using a twin-screw extruder at 230° C. to form a pellet and then dried. Then, injection molding was performed at an injection temperature of 200 to 250° C. using an injection machine to prepare a thermoplastic resin composition specimen.

The compounds used are shown in Table 1 below.

First graft copolymer (A): A resin (large diameter ASA) having an average particle diameter of 5,000 Å prepared by copolymerizing 50 parts by weight of an acrylate as a core and 35 parts by weight of styrene and 25 parts by weight of acrylonitrile as a shell Second graft copolymer (B): A resin (small diameter ASA) having an average particle diameter of 1,500 Å prepared by copolymerizing 50 parts by weight of an acrylate and 35 parts by weight of styrene and 25 parts by weight of acrylonitrile as a shell Aromatic vinyl compound-(meth)acrylate compound copolymer (C-1): A resin (XT500 resin, manufactured by LG Chem.) having a weight average molecular weight of 80,000 g/mol and including 70 parts by weight of (meth)acrylate and 30 parts by weight of styrene Aromatic vinyl compound-(meth)acrylate compound copolymer (C-2): A resin (XT510 resin, manufactured by LG Chem.) having a weight average molecular weight of 130,000 g/mol and including 70 parts by weight of (meth)acrylate and 30 parts by weight of styrene Syndiotactic polystyrene resin (D): Syndiotactic polystyrene (XAREC resin, Idemitsu product) having tacticity of 99% or more Aromatic vinyl compound-vinyl cyanide compound copolymer (E): A resin (80HF resin, manufactured by LG Chem.) having a weight average molecular weight of 150,000 g/mol and including 75 parts by weight of styrene and 25 parts by weight of acrylonitrile Plasticizer (F): Diisopropyl phthalate (manufactured by LG Chem.), a phthalic acid ester plasticizer, was used.

Test Example

The properties of specimens prepared in Examples 1 to and Comparative Examples 1 to 5 were measured by the following methods, and the results are shown in Tables 1 and 2.

Measurement Method

Average particle diameter (A): A weight average particle diameter was measured as an intensity value in a Gaussian mode using NICOMP 380 Particle Size Analyzer according to a dynamic laser light scattering method.

Impact strength (¼"; kgf·cm/cm): Measured according to ASTM D256.

Gloss (60°): Measured using a glossmeter at 60° according to ASTM D523. A high gloss value indicates excellent surface gloss.

Weight average molecular weight (g/mol): Drying was performed in an oven at 120° C. for 15 minutes to obtain a solid content, and the solid content was added to the THF solvent in an amount of 0.2% by weight to prepare a solution containing the solid content. Then, the solution was subjected to gel permeation chromatography (GPC) to measure weight average molecular weight.

Weather resistance ΔE: Weather-O-Meter was used, and when 6,000 hours passed under ASTM J1960 conditions, color was measured, and the measured color was compared with initial color. As the value of ΔE decreases, the degree of color change decreases, which means that weather resistance is better.

Tacticity: Qantitatively measured by 13 C-NMR.

TABLE 1

| Classification | Example 1 | Example 2 | Example 3 | Example 4 | Example 5 |
|---|---|---|---|---|---|
| Large diameter ASA (% by weight) | 30 | 20 | 30 | 30 | 30 |
| Small diameter ASA (% by weight) | 20 | 30 | 20 | 20 | 20 |
| XT500 (% by weight) | 50 | 50 | 25 | — | 25 |
| XT510 (% by weight) | — | — | 25 | 50 | — |
| 80 HF (% by weight) | — | — | — | — | 25 |
| Syndiotactic polystyrene | 3 | 3 | 3 | 3 | 3 |
| Plasticizer | 4 | 4 | 4 | 4 | 4 |
| Impact strength (¼") | 14.5 | 11.8 | 14.2 | 14.6 | 14.3 |
| Gloss (60°) | 31 | 34 | 32 | 32 | 33 |
| Weather resistance ΔE | 0.8 | 0.7 | 0.9 | 0.8 | 1.0 |

TABLE 2

| Classification | Comparative Example 1 | Comparative Example 2 | Comparative Example 3 | Comparative Example 4 | Comparative Example 5 |
|---|---|---|---|---|---|
| Large diameter ASA (% by weight) | 30 | 40 | 10 | 30 | 30 |
| Small diameter ASA (% by weight) | 20 | 10 | 40 | 20 | 20 |
| XT500 (% by weight) | — | 50 | 50 | 50 | 50 |
| XT510 (% by weight) | — | — | — | — | — |
| 80 HF (% by weight) | 50 | — | — | — | — |
| Syndiotactic polystyrene | 3 | 3 | 3 | 7 | — |
| Plasticizer | 4 | 4 | 4 | 4 | 4 |
| Impact strength (¼") | 14 | 16.2 | 9.8 | 6.5 | 33.6 |
| Gloss (60°) | 32 | 28 | 35 | 22 | 75.7 |
| Weather resistance ΔE | 1.6 | 2.0 | 1.0 | 0.8 | 0.9 |

As shown in Table 1, Examples 1 to 5 of the present invention exhibited excellent weather resistance while showing excellent gloss and impact resistance as compared with Comparative Examples 1 to 5. In particular, in Examples 1, 2, and 4, weather resistance was remarkably excellent.

In addition, as shown in Table 2, in the case of Comparative Example 1, in which the aromatic vinyl compound-(meth)acrylate compound copolymer was not used, weather resistance was deteriorated as compared with Examples.

In addition, in the case of Comparative Example 2, in which the weight ratio of the first graft copolymer to the second graft copolymer was 4:1, weather resistance was significantly deteriorated as compared with Examples. In the case of Comparative Example 3, in which the weight ratio of the first graft copolymer to the second graft copolymer was 1:4, impact strength was significantly reduced.

As a result of increasing or decreasing the amount of syndiotactic polystyrene, compared with Example 1, in Comparative Example 4, there was no difference in weather resistance, but impact strength significantly decreased. In the case of Comparative Example 5, in which syndiotactic polystyrene was excluded, gloss was too high, so that the resin was not suitable for use of exterior materials.

The invention claimed is:

1. A weather resistant thermoplastic resin composition comprising:
   100 parts by weight of a base resin, wherein the base resin comprises (A) 5 to 40% by weight of a first graft copolymer having an average particle diameter of 2,500 to 6,000 Å and containing acrylate rubber as a core, (B) 5 to 40% by weight of a second graft copolymer having an average particle diameter of 500 to 2,000 Å and containing acrylate rubber as a core, and (C) 20 to 80% by weight of an aromatic vinyl compound-(meth)acrylate compound copolymer having a weight average molecular weight of 50,000 to 150,000 g/mol, 65-85 wt. % of a methacrylate component and 15-35 wt. % of an aromatic vinyl component; and
   (D) 0.1 to 6 parts by weight of a syndiotactic polystyrene resin,
   wherein a weight ratio of the first graft copolymer to the second graft copolymer is from 1:0.5 to 1:3, and
   wherein the thermoplastic resin has a gloss value of 30-40 at 60° according to ASTM D523.

2. The thermoplastic resin composition according to claim 1, further comprising (E) 10 to 30% by weight of an aromatic vinyl compound-vinyl cyanide compound copolymer having a weight average molecular weight of 130,000 to 170,000 g/mol with respect to 100% by weight of the total base resin.

3. The thermoplastic resin composition according to claim 1, further comprising 0.1 to 10 parts by weight of a plasticizer with respect to 100 parts by weight of the base resin.

4. The thermoplastic resin composition according to claim 1, wherein the first graft copolymer is obtained by graft-polymerizing 25 to 55% by weight of an aromatic vinyl compound and 10 to 30% by weight of a vinyl cyanide compound onto 20 to 60% by weight of an acrylate rubber core.

5. The thermoplastic resin composition according to claim 1, wherein the second graft copolymer is obtained by graft-polymerizing 25 to 55% by weight of an aromatic vinyl compound and 10 to 30% by weight of a vinyl cyanide compound onto 20 to 60% by weight of an acrylate rubber core.

6. The thermoplastic resin composition according to claim 1, wherein the acrylate rubber is one or more selected from the group consisting of methyl acrylate rubber, ethyl acrylate rubber, butyl acrylate rubber, hexyl acrylate rubber, octyl acrylate rubber, and 2-ethyl hexyl acrylate rubber.

7. The thermoplastic resin composition according to claim 1, wherein the aromatic vinyl compound is one or more selected from the group consisting of styrene, α-methyl styrene, p-methyl styrene, vinyl toluene, and t-butyl styrene.

8. The thermoplastic resin composition according to claim 1, wherein the (meth)acrylate compound is one or more selected from the group consisting of methyl acrylate, ethyl acrylate, methyl methacrylate, ethyl methacrylate, methyl ethacrylate, ethyl ethacrylate, propyl acrylate, isopropyl acrylate, butyl acrylate, propyl methacrylate, isopropyl methacrylate, butyl methacrylate, and isobutyl methacrylate.

9. The thermoplastic resin composition according to claim 1, wherein the syndiotactic polystyrene resin is a syndiotactic polystyrene, a derivative of a syndiotactic polystyrene, or a mixture thereof.

10. The thermoplastic resin composition according to claim 1, further comprising one or more additives selected from the group consisting of an anti-dripping agent, a flame retardant, an antimicrobial agent, an antistatic agent, a stabilizer, a release agent, a heat stabilizer, an inorganic additive, a lubricant, an antioxidant, a light stabilizer, a pigment, a dye, and an inorganic filler.

11. The thermoplastic resin composition according to claim 1, wherein the thermoplastic resin composition has a ΔE value of less than 1.5 when 6,000 hours have passed under ASTM J1960 conditions.

12. A method of preparing a weather resistant thermoplastic resin composition,
wherein the thermoplastic resin composition comprises 100 parts by weight of a base resin, wherein the base resin comprises (A) 5 to 40% by weight of a first graft copolymer having an average particle diameter of 2,500 to 6,000 Å and containing acrylate rubber as a core, (B) 5 to 40% by weight of a second graft copolymer having an average particle diameter of 500 to 2,000 Å and containing acrylate rubber as a core, and (C) 20 to 80% by weight of an aromatic vinyl compound-(meth)acrylate compound copolymer having a weight average molecular weight of 50,000 to 150,000 g/mol, 65-85 wt. % of a methacrylate component and 15-35 wt. % of an aromatic vinyl component; and
(D) 0.1 to 6 parts by weight of a syndiotactic polystyrene resin,
the method comprises a step of mixing the first graft copolymer and the second graft copolymer in a weight ratio of 1:0.5 to 1:3, and
melt-kneading and extruding the mixture, and
wherein the thermoplastic resin has a gloss value of 30-40 at 60° according to ASTM D523.

13. Exterior materials for buildings, wherein the exterior materials are prepared using the composition according to claim 1.

* * * * *